United States Patent Office 3,031,102
Patented Apr. 24, 1962

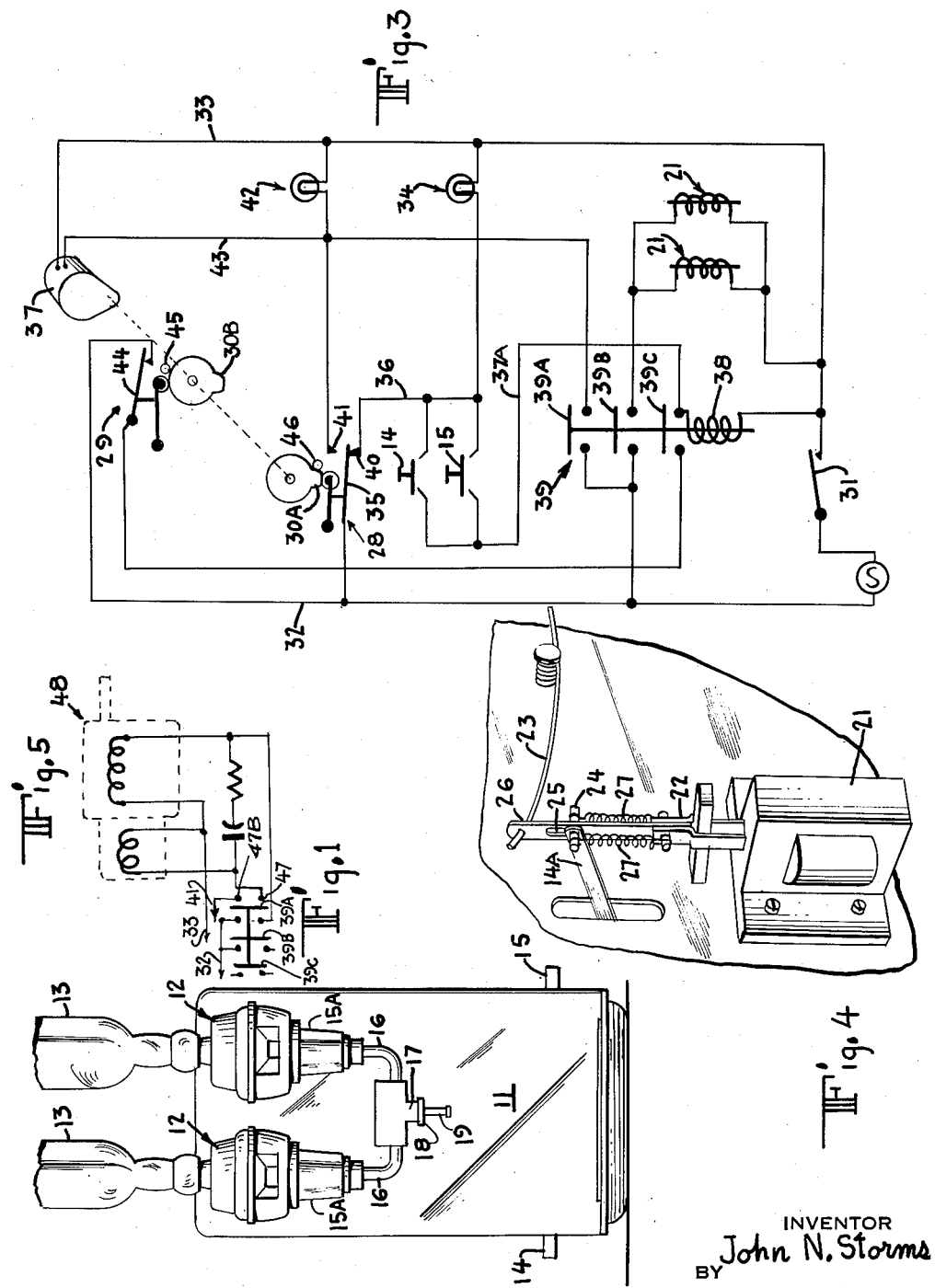

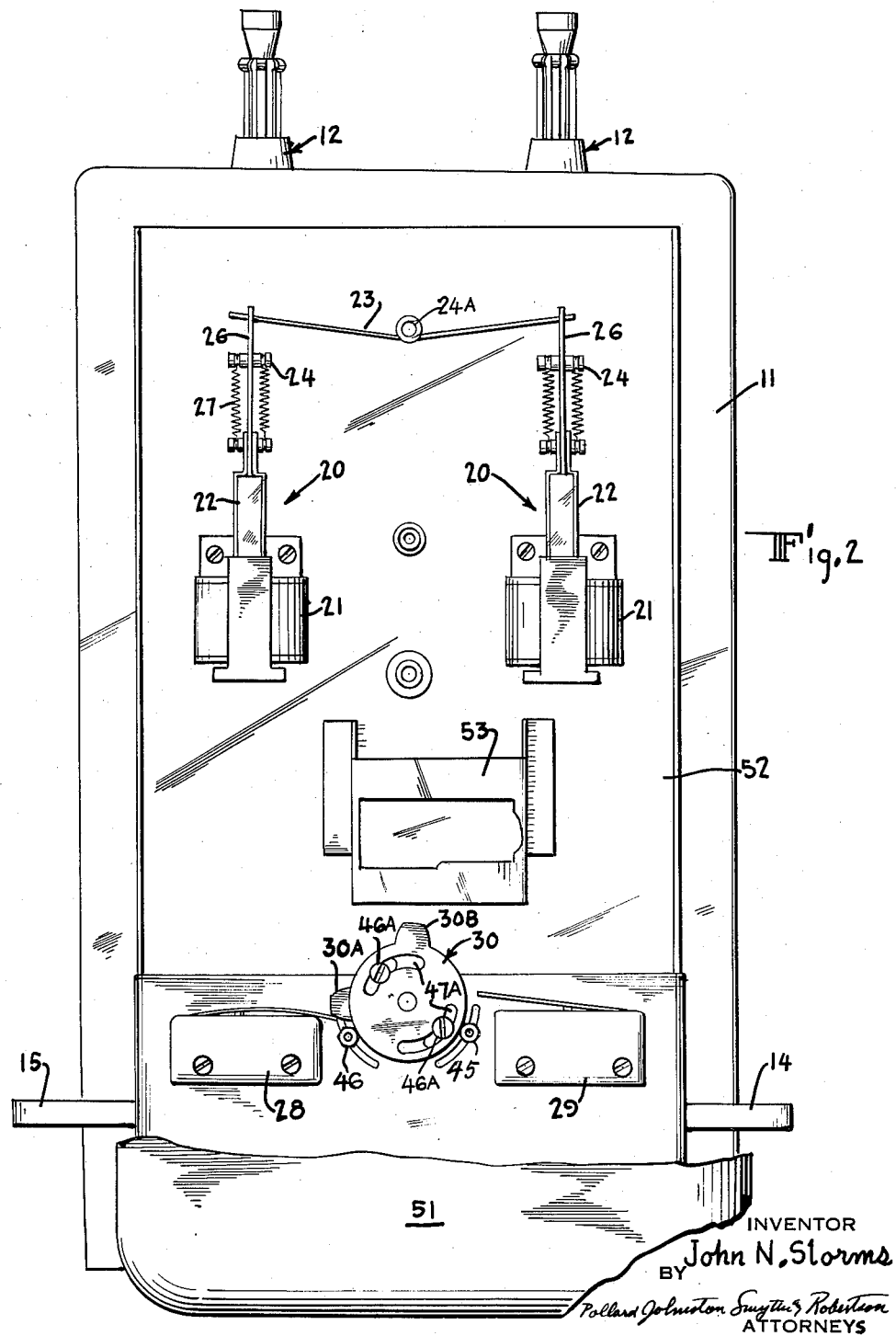

3,031,102
CONTROL DEVICE
John N. Storms, Quakertown, Pa., assignor to Ametek, Inc., a corporation of Delaware
Filed Dec. 2, 1957, Ser. No. 699,963
6 Claims. (Cl. 222—16)

The present invention relates generally to control devices, and is particularly concerned with an electrically operated control device for a liquid dispensing device which measures a predetermined quantity of each of a plurality of liquids and dispenses the liquids to mix them in accordance with a predetermined ratio.

Heretofore, control devices have been provided for dispensing arrangements which mix and dispense a plurality of liquids simultaneously. However, there has been no entirely satisfactory manner of preventing the start of a new cycle of operation before the previously actuated cycle of operation is completed. In a device where the cycle of operation is actuated by hand, inadvertent operation of the manual control may result in the dispensing of mixed liquids not having the predetermined quantity of each liquid.

Further, it often is desirable to be able to vary the time cycle of a control without having to change motor speed or gears.

One of the objects of this invention is to provide a control mechanism which ensures the completion of an entire cycle of operation upon actuation thereof prior to the initiation of another cycle of operation.

A further object is to provide a control device for an apparatus which accurately measures and simultaneously delivers quantities of liquids from two or more related dispensing devices, which control device prevents the apparatus from being reactuated manually or otherwise while a previously actuated measuring and dispensing cycle of operation is incomplete.

A still further object is to provide means for adjusting the periods of operation of a control timer without changing motor speeds or gearing.

In one aspect of the invention, the control device includes manual or other means for actuating a cycle of operation by activating the control. The actuation of the manual or other means activates timing means which controls the remainder of a cycle of operation in the apparatus being controlled. In order to prevent reactuation of the apparatus while the cycle of operation is incomplete, a cam and reversing motor means are provided for preventing such reactuation until the previously actuated cycle of operation is completed.

In a further aspect, it has been found desirable to have a plurality of independently adjustable cams rotated by the timing motor and controlling various electrical switches which open and close separate electrical circuits according to a program, the program being determined by the positioning of the actuating portions of the cams relative to each other and to the controlled switches. By making the cams adjustable relative to each other, the period of the first part of the cycle can be adjusted relative to the second part of the cycle.

It also is possible to have a continuously repeating cycle and to use the control for various other purposes.

The foregoing and other objects, features and advantages of the invention will become apparent from the following description and drawings which are merely exemplary.

In the drawings:

FIG. 1 is a front elevational view of an apparatus for dispensing measured quantities of two liquids in accordance with a preferred embodiment of this invention;

FIG. 2 is a rear elevational view of the apparatus of FIG. 1 showing the preferred form of control device;

FIG. 3 is a wiring diagram of an electrical circuit included in the apparatus of FIGS. 1 and 2;

FIG. 4 is a fragmentary perspective view of one of the operating solenoids looking from the rear of the device; and FIG. 5 is a fragmentary view of another type of timing motor.

The control device will be described specifically in conjunction with operation of liquid dispensing devices but the principles thereof can be used for other purposes. The apparatus may include a housing 11 having two liquid dispensing devices 12, 12 mounted on the front thereof. Although only two dispensing devices are illustrated, it is to be understood that a greater number of devices may be employed.

Each of the liquid dispensing devices preferably is of the type disclosed generally in United States Patent No. 2,631,755. Such a device supports a bottle or container 13, 13 containing the liquid to be dispensed, the bottle being so supported thereon that it cannot be removed, except by an authorized person having a key. Upon actuation of each of the dispenser operating levers 14A (FIG. 4), a measured quantity of liquid will be poured and then, upon release of said levers, the measuring cups 15A thereof will be refilled in readiness for the next dispensing operation. The quantity of liquid to be dispensed from each of the dispensers is determined by the selection of measuring cups 15A having predetermined volumetric capacities. Upon actuation of each of the operating levers 14A, the entire quantity of liquid within each of measuring cups 15A is released. Cups holding different quantities may be used in the dispenser at one time in order to obtain various ratios of the liquids in the final mixture. A measured quantity of liquid from each of the dispensers is carried through pipes 16, 16 to outlet 17. Said outlet may have a suitable pivoted cap 18 thereon which can be pressed open by a glass or other receptacle contacting a downwardly extending leg 19, which is connected to the cap, the details of which are immaterial. Thus, a mixture can be obtained of the desired quantity of the liquids being dispensed in a predetermined ratio as determined by the measuring cups 15A.

In order to activate or start the control device, buttons or switches 14, 15 can be provided on each side of housing 11. As will become apparent hereafter, either of the switches can be depressed to start a cycle of operation of the dispensing units 12, 12. If desired, it also is possible to provide only one such switch but it is convenient to have switches on either side of the dispenser.

Each of the dispensing means is controlled or actuated by a solenoid actuated mechanism 20. When solenoid 21 is energized, a plunger or armature 22 will move downwardly against the tension of one of the ends of spring 23, said spring being fastened at 24A to the frame 52 of the machine. Thus, activation of solenoid 21 will serve to actuate its dispenser operating lever 14A to pour a measured quantity of liquid. Upon deenergization of solenoid 21, the actuating lever 14A will move upwardly and permit the respective measuring cups 15A to refill. Actuating lever 14A can be connected to link 26 through a pin 24 and slot 25 in link 26. The actuating lever 14A is pulled downwardly through springs 27 and pin 24, in the slot 25, providing for overtravel of the mechanism.

Switches 28, 29 can be located on the frame of the machine adjacent the composite adjustable cam 30. These switches may be of the style sold under the name "Micro-Switch" or any other suitable type. The rear cover 51 has been shown broken away in the interests of clarity and may be held onto the frame 52 by bracket 53 which engages a suitable lug (not shown) on the interior of the cover.

Referring to the circuit of FIG. 3, at the start of a work day or at the time when the apparatus is to be actuated, master switch 31 can be closed so as to energize busses or lines 32, 33 so as to prepare the various circuits for activation when hand controls 14 or 15 are operated. If desired, a signal light 34 may be provided for indicating that the apparatus is in condition to be actuated, said light being energized through bus 32, switch blade 35, line 36 and bus 33. The light will remain on until the start of operation of timing motor 37. When it is desired to start the mechanism, either of the switches 14, 15 can be pressed so as to close a circuit from bus 32, switch blade 35, line 36, line 37A, solenoid 38 to bus 33. Solenoid 38 of relay 39 then will close switch blades 39A, 39B and 39C.

The timing motor may be of any well known synchronous motor type such as shown generally in United States Patent No. 2,436,231, arranged so that when stopped as it rotates in one direction, upon the next reversal wave of alternating current, it will start to move in the opposite direction.

As the drive shaft of the timing motor 37 rotates clockwise, cam 30A will release switch 28 and permit the blade 35 thereof to move from contact 40 to contact 41, thereby isolating switches 14, 15 from their connection to bus or line 32 so as to disable these switches. Such will extinguish indicator light 34 and will energize the run or operating indicator light 42, indicating that the timing motor is operating. Solenoids 21 will be energized through switch blade 39B to operate the dispensers in the pour period of the cycle thereof. The solenoids must be kept energized long enough for the period to be completed. Timing motor 37 also is connected to the lines 32 and 33 through such switch blade 35, contact 41 and line 43, this connection being in parallel with the circuit through switch blade 39A of the closed relay 39.

The composite cams will continue to rotate in a clockwise direction until cam 30B opens switch blade 44 of normally closed switch 29. Such will open the circuit through the solenoid holding switch blade 39C and thus deenergize solenoid 38 and permit relay 39 to open. This will deenergize the circuit through blade 39B to the solenoids 21 of the dispensing mechanism 20. As just mentioned, timing motor 37 still will be energized through switch blade 35, and the cams will continue rotating until cam 30B hits the adjustable stop 45, at which time, motor 37 will reverse itself in direction and the shaft will move counter-clockwise (FIG. 3). The position of stop 45 can be adjusted so as to vary the time of the first part of the cycle to the reversal of the motor. Both of the cams now will be rotated until the cam 30A moves switch blade 35 away from contact 41 so as to deactivate timing motor 37. The adjustable stop 46 will limit rotation of the cams. The arrangement is now in condition for reactivation when either switch 14 or 15 are operated.

From the above, it will be readily understood that once either of the manual switches 14 or 15 have been actuated, the operator has no control over the timer until the cycle has been completed.

The relative position of the cams or projections thereon can be adjusted through the use of screws and slots 46A and 47A to permit relative rotation of the cams and thus control the various portions of the time cycle. The adjustment of adjustable stop controls can be employed to vary the ratio between the first, or pouring period of the cycle, and the second, or measuring period of the cycle. Normally, these two periods are equally divided.

In place of the motor control of FIG. 3, an external phase shifting circuit can be used as illustrated in FIG. 5 wherein a pair of reversing switch contacts 47, 47B can be incorporated as a fourth switch element in the relay to change the phase relations in synchronous motor 48 and thus reverse the motor. Further, other cams can be connected to the composite cam so as to change the timing independently of the other two.

Although a particular embodiment of the invention has been described in detail here and shown in the accompanying drawings, it is to be understood that such embodiment is merely illustrative, and that various changes and modifications may be effected within the scope of the appended claims.

What is claimed is:

1. A dispensing device having means for measuring and dispensing a predetermined quantity of each of a plurality of liquids and dispensing said predetermined quantities so as to mix the liquids in a predetermined ratio, manually operated switch means for actuating a cycle of operation of said measuring and dispensing means, a reversible timing motor responsive to the actuation of said manually operated switch means for controlling the cyle of operation, means responsive to said timing motor for reversing said timing motor at a predetermined point during its control of the cycle of operation, means responsive to said timing motor for stopping said timing motor being reversed at the starting point of the timing motor, and switch means responsive to said timing motor for preventing the further operation of said manually operated means until the completion of the cycle of operation.

2. A dispensing device having means for measuring and dispensing a predetermined quantity of each of a plurality of liquids and dispensing said predetermined quantities so as to mix the liquids in a predetermined ratio, manually operated means for actuating a cycle of operation of said measuring and dispensing means, reversible timing motor means energized by the actuation of said manually operated means for controlling the cycle of operation, means responsive to said timing motor for reversing said timing motor at a predetermined point during its control of the cycle of operation, means responsive to said timing motor for stopping said timing motor being reversed at the starting point of the timing motor, cam means operable by said motor means, and switch means movable to open position in response to movement of said cam means to a predetermined position so as to prevent the further operation of said manually operated means until the completion of the cycle of operation.

3. In a device which, during each cycle of operation, measures a predetermined quantity of each of a plurality of liquids and dispenses said predetermined quantities so as to mix the liquids in a predetermined ratio, the combination comprising manually operated switch means for actuating a cycle of operation, reversible timing motor means responsive to the actuation of said manually operated means for controlling the cycle of operation, means for reversing said timing motor at a predetermined point during its control of the cycle of operation, means responsive to said timing motor for stopping said timing motor being reversed at the starting point of the timing motor, valve means for dispensing a predetermined quantity of each liquid so as to mix said liquids according to the predetermined ratio, relay means for actuating said valve means, a normally closed switch permitting the actuation of said valve means in response to the energization of said relay means, first cam means operable by said timing motor means, said normally closed switch being opened in response to movement of said first cam means to a predetermined position so as to close said valve means, second cam means operable by said timing motor means, and switch means responsive to the movement of said second cam means to a predetermined position for preventing the further operation of said manually operated switch means affecting said cycle until the completion of the cycle of operation.

4. In a device which, during each cycle of operation, measures a predetermined quantity of each of a plurality of liquids and dispenses said predetermined quantities so as to mix the liquids in a predetermined ratio, the combination comprising at least one manually operated normally open switch which, when closed, actuates a cycle of operation, a constant speed timing motor responsive to the actuation of said manually operated switch for controlling the cycle of operation, means responsive to said timing motor for reversing said timing motor at a predetermined point during its control of the cycle of operation, means responsive to said timing motor for stopping said timing motor being reversed at the starting point of the timing motor, a pair of adjustable cams mounted on the timing motor shaft for rotation therewith, solenoid operated valve means for dispensing a predetermined quantity of each liquid so as to mix said liquids according to the predetermined ratio, relay means for actuating said valve means, a normally closed relay energizing switch, said relay energizing switch being moved to open position by one of said cams when it is moved by said timing motor to a predetermined position so as to close said valve means and stop the dispensing of liquid, and switch means moved in response to the movement of the other cam to a predetermined position so as to remove said manually operated switch means from the operating circuit and prevent operation thereof affecting the cycle until the completion of the cycle of operation.

5. In a device which, during each cycle of operation, measures a predetermined quantity of each of a plurality of liquids and dispenses said predetermined quantities so as to mix the liquids in a predetermined ratio, the combination comprising manually operated switch means for actuating a cycle of operation, timing motor means responsive to the actuation of said manually operated means for controlling the cycle of operation, valve means for dispensing a predetermined quantity of each liquid so as to mix said liquids according to the predetermined ratio, relay means for actuating said valve means and said motor means, said relay means being initially energized by said manually operated switch means, a normally closed switch means for maintaining the energization of said relay means, first cam means operable by said timing motor means, said normally closed switch means being opened in response to movement of said first cam means to a predetermined position so as to de-energize said relay means to close said valve means, second cam means operable by said timing motor means, said cam means being adjustable for changing the total time of said cycle and portions of said cycle, and switch means responsive to the movement of said second cam means to a predetermined position for preventing the further operation of said manually operated switch means affecting said cycle until the completion of the cycle of operation and for maintaining said motor means energized after said relay means is de-energized.

6. In a device which, during each cycle of operation, measures a predetermined quantity of each of a plurality of liquids and dispenses said predetermined quantities so as to mix the liquids in a predetermined ratio, the combination comprising at least one manually operated normally open switch which, when closed, actuates a cycle of operation, a reversible timing motor responsive to the actuation of said manually operated switch for controlling the cycle of operation, first and second adjustable cams mounted on the timing motor shaft for rotation therewith, adjustable stop means for said first cam, said first cam and stop means being adjustable for determining the point of reversal of said timing motor to change the total time of said cycle and of portions of said cycle, solenoid operated valve means for dispensing a predetermined quantity of each liquid so as to mix said liquids according to the predetermined ratio, relay means for actuating said valve means, a normally closed relay energizing switch, said relay energizing switch being moved to open position of said first cam when it is moved by said timing motor to a predetermined position so as to close said valve means and stop the dispensing of liquid, and switch means moved in response to the movement of the other cam to a predetermined position so as to remove said manually operated switch means from the operating circuit and prevent operation thereof affecting the cycle until the completion of the cycle of operation.

References Cited in the file of this patent

UNITED STATES PATENTS

| | | |
|---|---|---|
| 1,977,781 | Staegemann | Oct. 23, 1934 |
| 2,376,403 | Thompson et al. | May 22, 1945 |
| 2,621,838 | Price | Dec. 16, 1952 |
| 2,800,152 | Sloier | July 23, 1957 |
| 2,828,889 | Joschko | Apr. 1, 1958 |